United States Patent [19]

Howard

[11] Patent Number: 4,694,182

[45] Date of Patent: Sep. 15, 1987

[54] HAND HELD BAR CODE READER WITH MODULATED LASER DIODE AND DETECTOR

[75] Inventor: P. Guy Howard, Junction City, Oreg.

[73] Assignee: Spectra-Physics, Inc., San Jose, Calif.

[21] Appl. No.: 834,286

[22] Filed: Feb. 27, 1986

[51] Int. Cl.⁴ ............................................. G06K 7/10
[52] U.S. Cl. .............................. 250/566; 250/214 B; 235/462; 235/472
[58] Field of Search .................... 250/214 B, 568, 216, 250/566; 235/462, 472, 463, 474

[56] References Cited

U.S. PATENT DOCUMENTS

| | | | |
|---|---|---|---|
| 3,867,628 | 2/1975 | Brown | 250/214 R |
| 4,047,023 | 9/1977 | Key et al. | 250/568 |
| 4,160,156 | 7/1979 | Sherer | 235/463 |
| 4,387,297 | 6/1983 | Swartz et al. | 250/568 |

Primary Examiner—Edward P. Westin
Assistant Examiner—Charles Wieland
Attorney, Agent, or Firm—Donald C. Fix; Paul Davis; T. M. Freiburger

[57] ABSTRACT

A hand held bar code reader employs a laser diode as its laser source, for an efficient and compact construction. The diode is modulated, and an associated bar code reading detector is timed accordingly, so that (1) the effects of strong ambient light which may be present on the bar code surface can be subtracted out, by alternating reflected light readings of the detector between laser beam plus ambient and ambient alone, and subtracting the readings electronically, and (2) peak power can be increased to obtain more dependable readings while staying within permissible power levels for such devices, since average power is reduced by the modulation of the laser.

3 Claims, 7 Drawing Figures

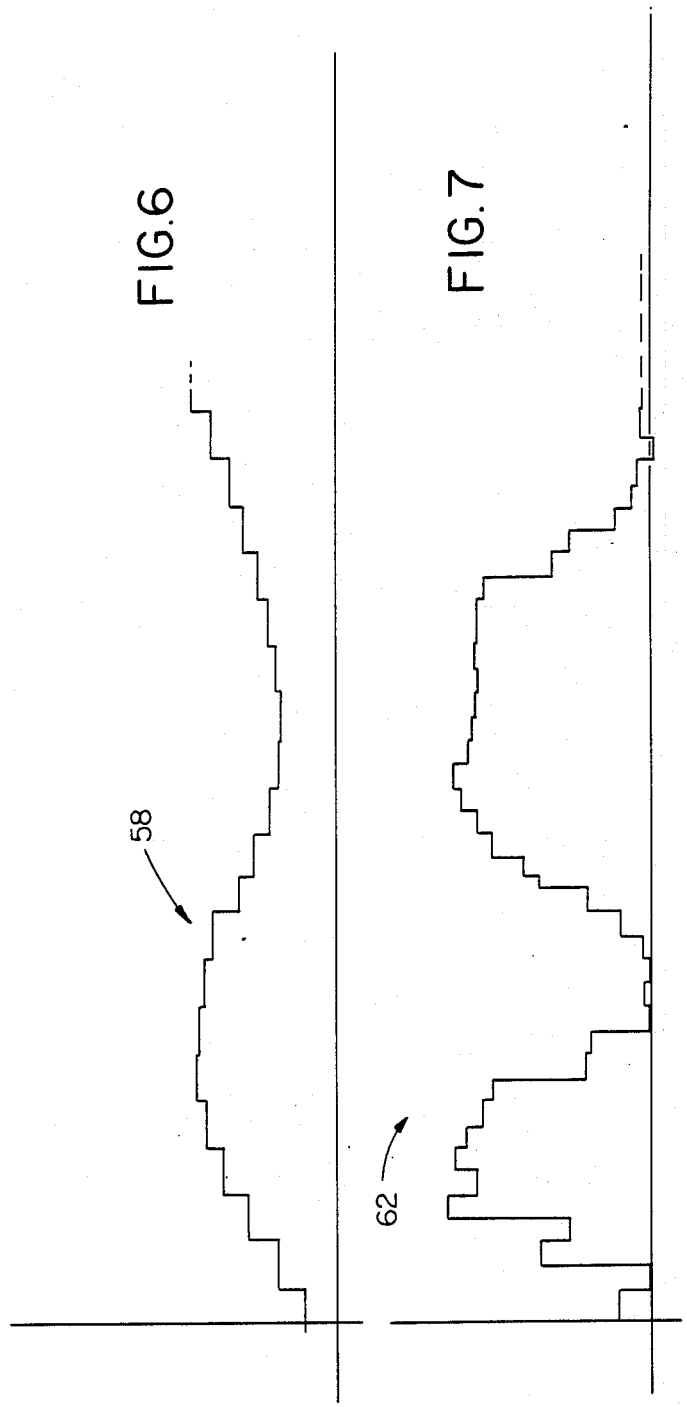

HAND HELD BAR CODE READER WITH MODULATED LASER DIODE AND DETECTOR

BACKGROUND OF THE INVENTION

The invention relates to bar code readers, and specifically to a hand held portable bar code reader of efficient and compact design.

Hand held bar code readers, employing scanned laser beams as an illuminating source for reading the bar codes, have come into wide use and have potentially many more uses. Conventionally, laser sources used for such portable bar code readers have included gas lasers such as helium-neon lasers, for example. However, these lasers are relatively large and cumbersome for use in a hand held laser, and a compact, lightweight, highly efficient laser diode would be much preferable for such applications.

There is a problem which is particularly acute with hand held bar code readers, and that is the problem of ambient light striking the bar code surface. Hand held readers are often used in bright ambient light, such as at loading docks where the sun might directly strike the bar code being read, essentially blinding the detectors of the bar code reader and preventing an accurate reading.

Conventionally, relatively expensive optical band pass filters have been used to alleviate this problem in bar code readers. These are generally effective, but their expense is an important practical consideration which may make a hand held reader too expensive to be feasible for may applications.

Another problem faced by hand held laser bar code scanners is that of restrictions from regulatory agencies on permissible beam output power. In some situations where hand held scanners are used, the distance to the bar code surface is relatively long, and for good readings this usually requires either a stronger laser beam, or the operator's moving closer to the bar code.

U.S. Pat. No. 4,387,297 discloses hand held laser bar code readers in several different embodiments. In columns 19 and 20 of that patent, there is briefly mentioned, in general terms, the provision of a hand held laser bar code reader incorporating a laser diode as the beam source, which may be of the continuous wave or pulse type.

It is an object of the present invention to provide an efficient, relatively low cost hand held bar code reader using a laser diode and being of efficient and economical construction, and with beam power sufficient to read bar codes at considerable distances while still remaining within regulatory limits, and including the capability of accurately reading a bar code in conditions of strong and viable ambient light.

SUMMARY OF THE INVENTION

The present invention achieves these objectives by using a laser diode as an effecient and compact laser beam source in a hand held bar code reader, and by modulating the laser bar code to pulse its beam in short pulses at regular intervals, thereby greatly lowering average beam power and enabling a significant increase in peak power without exceeding safe limits.

In addition, the detector means for reading reflected laser light from a bar code is also caused to read in pulses. The reading pulses are more frequent than the laser beam pulses, preferably twice the frequency, with a reading pulse occurring simultaneously with each beam pulse and an additional reading pulse occurring between the pulses. As a result, at each team pulse the detection system reads a summation of reflected laser light plus reflected ambient light from the bar code, while between beam pulses the detection system reads reflected ambient light alone.

Processing electronics of the system process these detected signals to subtract the ambient signal from the adjacent beam plus ambient signal, yielding a signal value representing reflecting laser light alone. This produces a much more accurate and dependable reading of the bar code, better than that attainable with with the more expensive band pass filters used in the prior art.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 6 is a further graphic representation showing the ambient light alone in a stair step function.

FIG. 7 is a final graphic representaton showing a derived stair step function for the bar code signal strength alone, ambient having been subtracted out.

DESCRIPTION OF PREFERRED EMBODIMENTS

Figure 1:
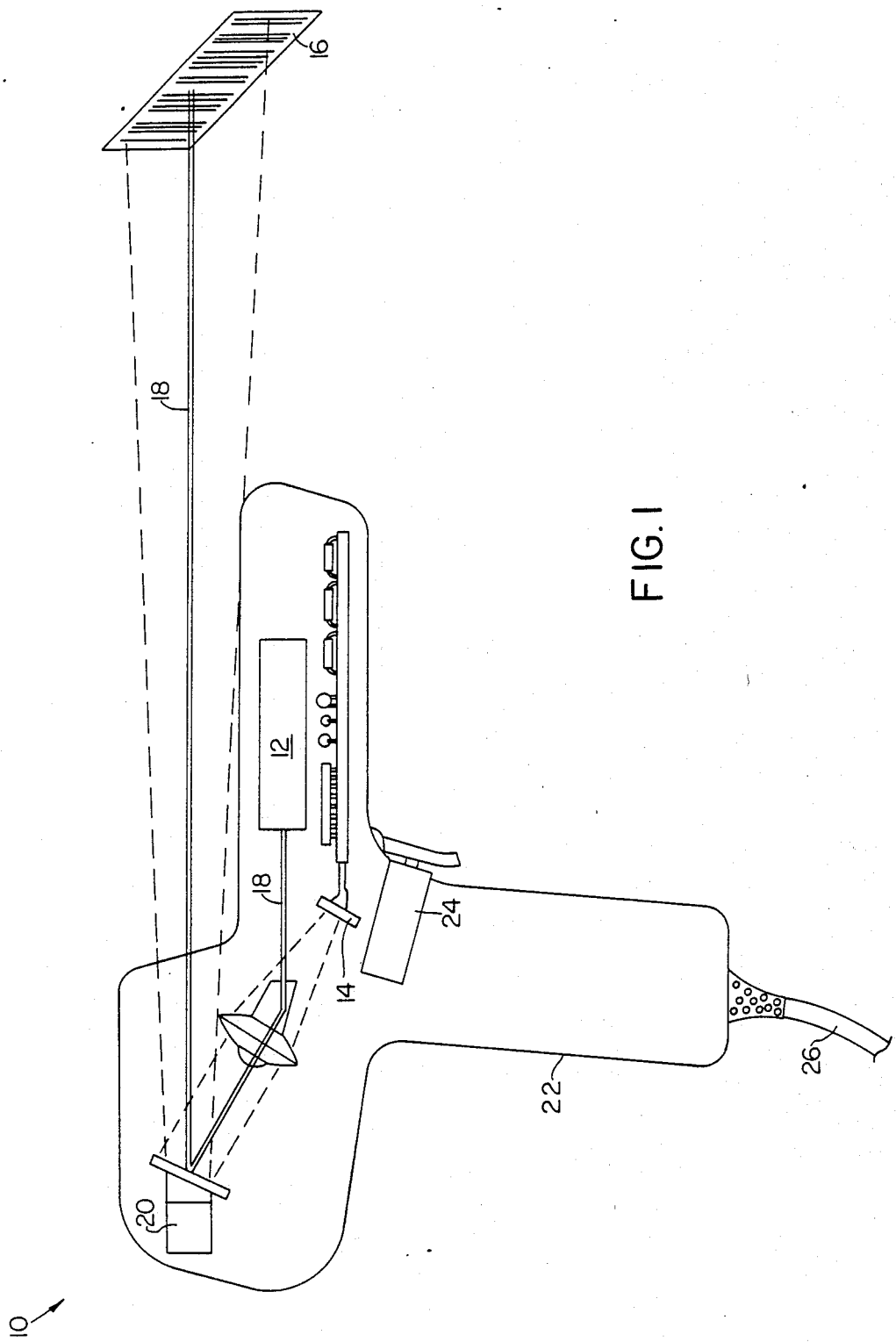
FIG. 1 is a sectional elevation view showing a hand held laser bar code reader utilizing a laser diode as a beam source in accordance with the invention, and indicating a bar code being read by the bar code reader.

In the drawings, FIG. 1 shows in cross section an example of a hand held bar code reader 10 which uses a laser diode 12 as a beam source in accordance with the invention. The laser bar code reader 10 also includes a photodetector 14 for detecting the level of reflected light from a bar code 16 across which a laser beam 18 from the laser diode is scanned.

Also seen in FIG. 1, represented generally schematically is a scanning mechanism 20 for scanning the beam in the desired line or pattern for reading bar codes, a handle 22 for gripping by the user, and a convenient spring-loaded "on" button or trigger 24. A cord 26 extends from the bottom of the handle for connection to a power supply and storage unit (not shown), which may, for example, hang at the waist of the user.

In accordance with the invention and as discussed above, the laser beam 18 is pulsed at a preselected frequency so that peak power can be higher for a given safe average power and so that ambient light can be supressed or subtracted out to give more accurate bar code readings even in relatively strong and fluctuating ambient light conditions. This eliminates the need for expensive band pass filters as typically used on prior hand held readers. The manner in which these results are achieved will now be described.

Figure 2:
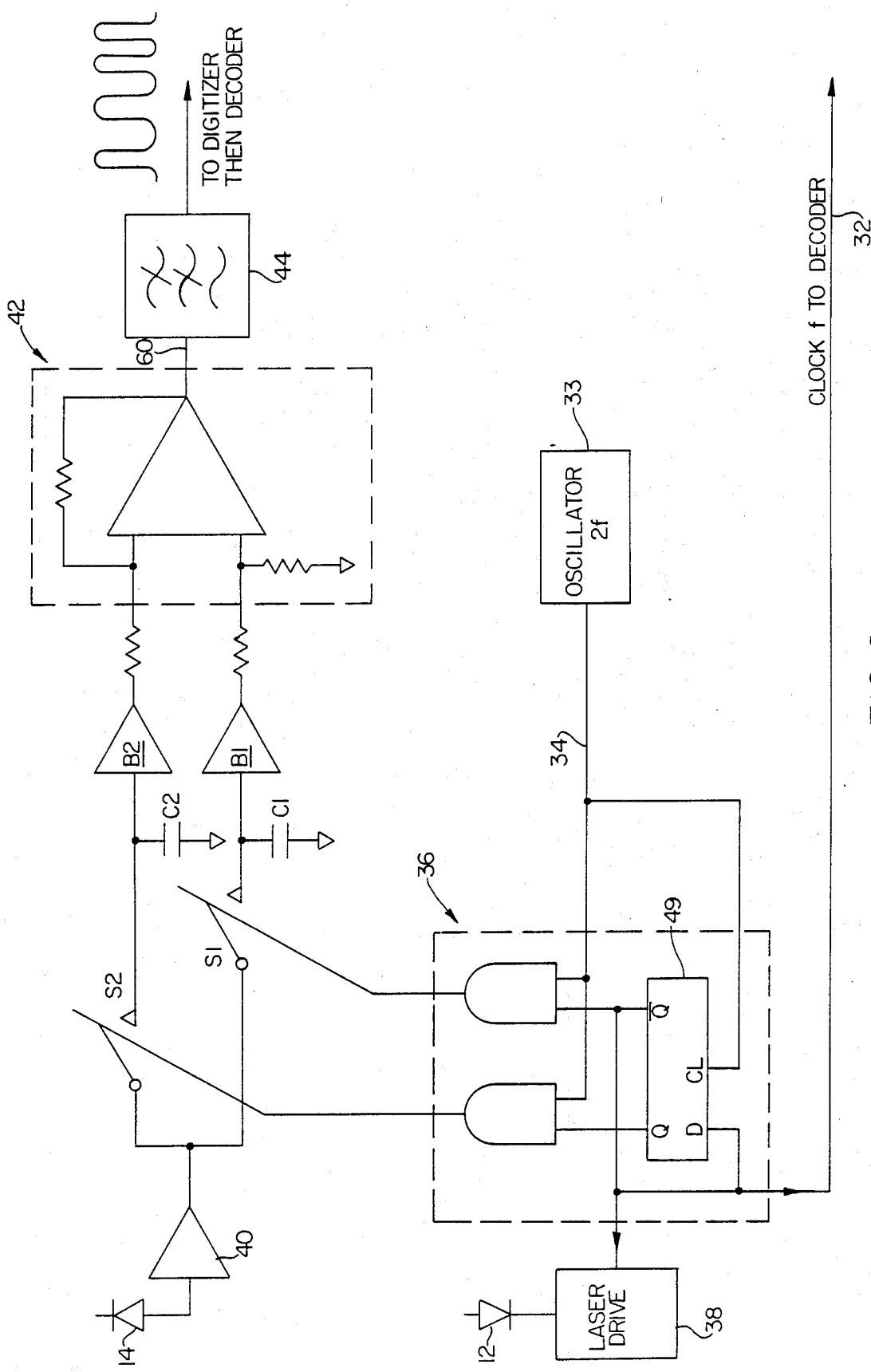
FIG. 2 is a schematic circuit diagram showing one embodiment of a system for detecting both the level of light representing the reflected bar code signal plus ambient light, and the level of light representing ambient light alone from the bar code, and for subtracting the ambient from the signal plus ambient, to produce an accurate signal representing reflected laser beam light alone for accurate bar code readings.

FIG. 2 schematically indicates a simple circuit which may be used to implement the system of the invention. The circuit, generally indicated at 30, includes the laser diode beam source 12 and the photodetector 14, preferably a detector diode. The laser diode 12 is pulsed at a rate sufficiently fast to accurately resolve the narrowest bar used in the type of bar code to be read. Typically, this amounts to several pulses during the period of time required for the scanning beam to scan across the narrowest line of the bar code.

However, this does not require a special determination, since the bar code reader typically includes a timing device for the decode function, at a frequency intended to resolve the narrowest line. In the embodiment shown, a decode clock 32 is the same as the laser diode drive signal as indicated in the drawing, and is generated from an oscillator 33 of twice that frequency, as described further below.

In the system of the invention, the oscillator 33 puts out a 2f frequency signal which is used to drive, through a phase splitter 36, not only the pulsing of the laser diode 12, but also a pair of switches S1 and S2 which pulse the activation of the detector 14. The switches S1 and S2 are out of phase with respect to each other. The frequency signal 34 from the oscillator 33 goes to the phase splitter/two-phase drive device 36 which sends a signal in a first phase simultaneously to the switch S1 and to a pulsing drive 38 for the laser diode 12. A second signal is sent in a second phase to the switch S2 alone, so that the switch S2 is closed between closings of the switch S1, but at the same frequency f.

Therefore, the switch S2 will close and the detector diode 14 will be caused to read, at instances between pulses of the laser beam, so that the readings caused by the switch S2 will be of ambient light alone.

However, when the switch S1 is closed it will be simultaneously with the pulsing of the laser beam, so that readings caused by the switch S1 will be of the total light reaching the detector, ambient plus reflected laser beam.

As indicated in FIG. 2, the signal from the detector diode 14 is amplified by an amplifier 40 and then passes through one of the switches S1, S2 to be stored on a capacitor C1 or C2. The resulting signals are then buffered by buffers B1 or B2 and fed into a differencing device 42, shown as a differential amplifier, which receives the two buffered signals and subtracts the value of the S2/C2 signal (ambient alone) from the value of the S1/C1 signal (beam signal plus ambient).

The differenced signal may then go through a low pass filter 44, as explained below, after which it is passed on to a digitizer to redigitize and reconstruct the bar code information, as a part of the conventional process of decoding the label. The digitizer is not shown in FIG. 2.

FIGS. 3 through 7 illustrate schematically in graphs the process of the invention, using the system illustrated in FIG. 2.

Figure 3:
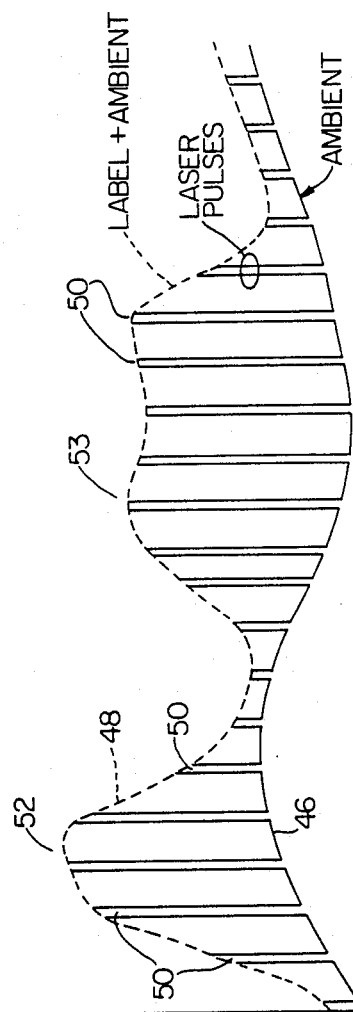
FIG. 3 is a graph of signal strength versus time, indicating a pulsed signal representing bar code signal plus ambient, and also a base curve representing ambient light alone, and indicating an envelope between the two curves representing the bar code signal.

FIG. 3, which is a plotting of signal intensity versus time, includes a lower or base curve 46 representative of ambient light alone. In the illustrated example, ambient light is fluctuating. In fact the amplitude of ambient light fluctuations could be as great or even greater than the fluctuatons in reflected laser light from the bar code as the beam scans across the lines of the bar code. The curve 48 above the curve 46 shows that the net reflectivity of the bar code label is changing as the beam scans across it, with the curve 48 representing all light sensed by the detector diode 14, ambient plus reflected laser beam light.

FIG. 3 shows beam pulses 50 superimposed in an envelope between the two curves 46 and 48, representing the intensity of signal received due to laser light alone reflecting off the bar code. The two peaks 52 and 53 shown as examples in FIG. 3 will be indicative of highly reflective lines in the bar code (usually white spaces between black bars or lines of a bar code), once ambient light has been subtracted from the total values.

As illustrated in FIG. 3, both the "off" points and the "on" points on the curve 48 of total reflected light have non-zero values, i.e. values higher than they would have if ambient light were not present.

Figure 4:
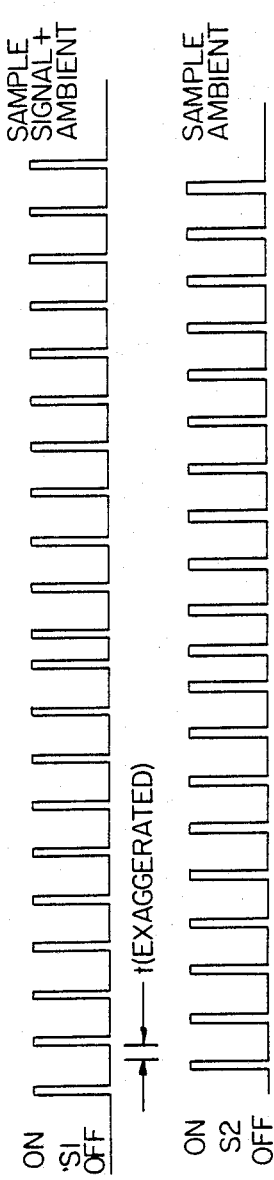
FIG. 4 is a graphic representation of signals from switching of a signal detector by two switches in out-of-phase relationship, the first signal representing ambient plus bar code signal and the second representing ambient alone.

FIG. 4 schematically indicates the timing of switches S1 and S2. The figure generally shows exemplary signal magnitudes detected as a result of each closing of each switch. Both switches S1 and S2 are switched at the frequency f of the decode clock 32, but they are offset so as to occur at different times. They may be offset by one-half frequency or any other selected increment, so long as they constitute discrete and non-coincident "on+ points of the switches. The phase splitter/two-phase drive 36 may include a D latch 49 as indicated in FIG. 2, which will effect a one-half frequency offset.

Figure 5:
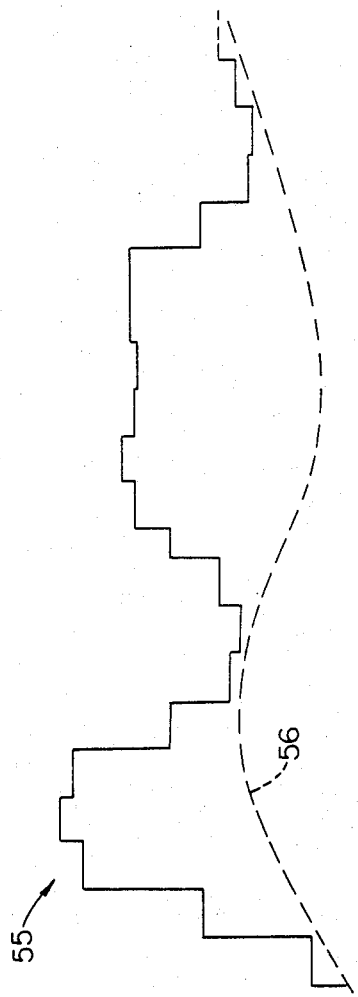
FIG. 5 is another graphic representation in which a stair step function is derived representing signal plus ambient light, with a dashed base curve indicative of ambient alone.

When the S1 switch is closed by the phase splitter and two phase drive device 36, the capacitor C1 stores the value of signal plus ambient, generating a stairstep wave form 55 which might appear as shown in FIG. 5. A dashed base curve 56 in FIG. 5 indicates the fluctuating ambient reflected light that contributes to the values of the stairstep function 55.

The switch S1 is opened and then the switch S2 is closed, putting a value of ambient light alone on the capacitor C2 shown in FIG. 2. The C2 value creates a stairstep function 58 which might appear as shown in FIG. 6, representing the fluctuation of reflected ambient light alone.

However, the system does not output either stairstep function 55 or 58, but differences them first. The stored values in the capacitors C1 and C2 are put through high input impedance buffers B1 and B2, and the ambient is subtracted from the signal plus ambient in the differential amplifier 42. The resulting function, at a point 60 in FIG. 2, is a stairstep function 62 shown in FIG. 7, representative of the variation in detected reflected light from the bar code with the ambient supressed.

That signal can then be passed through the low pass filter 44 to reconstruct a smooth wave form as indicated in FIG. 2, then redigitized and taken through the conventional process of decoding the label. FIG. 2 indicates these further steps, with the decode clock 32 indicated as leading to a decoder.

The system need not read ambient between each pair of adjacent laser beam pulses. Instead, the detector can be pulsed after every second beam pulse, every fifth, or other subharmonic multiples of the beam pulsing frequency. The frequency of readings required is related to the upper frequency content of ambient light. The subject of digital sampling and sampling rate is discussed in *Information Transmission and Noise,* by Mischa Schwartz McGraw-Hill 1959, 1970, Library of Congress 70-98490.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

I claim:

1. A hand held bar code reader using a laser diode as a beam generator, comprising,
    a hand held bar code reader body, with external means for activating the bar code reader,
    a laser diode mounted within the body in position to project a beam out of the body, in a direction in which the bar code reader body is pointed,
    scanning means for scanning the beam of the laser diode,
    detector means mounted within the body, for reading a reflected light signal from a bar code over which the beam from the laser diode is scanned,
    power supply means for supplying power to the laser diode and the detector means,
    diode modulation means for causing the laser diode to project the laser beam in intermittent pulses, at regular intervals, the intervals being sufficiently short to still assure that a shortest bar interval of the bar code can be read,
    detector modulation means for causing the detector to read only intermittently, including detector readings simultaneous with pulses of the laser and including detector readings timed between pulses, and
    differencing means connected to the detector means for subtracting the detector signal obtained between laser beam pulses, representing ambient light, from the detector signal read simultaneously with laser beam pulses, representing laser plus ambient light,
    whereby accurate bar code readings can be obtained even in strong and fluctuating ambient light conditions.

2. The bar code reader of claim 1, wherein the diode modulation means and the detector modulation means comprise an oscillator generating a timing signal at a selected frequency, a pair of switches connected to the detector means for pulsing the detector when either switch is closed, and two-phase drive means for receiving the timing signal from the oscillator and producing two separate drive signals out of phase from each other and both harmonically related to the timing signal, the first drive signal being connected to close the first switch simultaneously with pulsing the laser diode and the second drive signal being connected to close the second switch between pulses of the laser diode.

3. A method for suppressing ambient light from the signal of a laser bar code reader to obtain accurate bar code readings, comprising,
    modulating a beam of a laser source to pulse the beam in intermittent pulses, at regular intervals, the intervals being sufficiently short to still assure that the shortest interval of the bar code can be read,
    switching a detector of the bar code reader to read intermittently, with detector readings at intervals including detector readings simultaneous with pulses of the laser and including detector readings timed between laser pulses, and
    subtracting the detector signal obtained between laser beam pulses, representing ambient light, from the detector signal read simultaneously with the laser pulse, representing signal plus ambient, and obtaining a value representing the bar code signal with ambient suppressed.

* * * * *